(12) United States Patent
Liao et al.

(10) Patent No.: US 10,220,327 B2
(45) Date of Patent: Mar. 5, 2019

(54) STEAM HEATING TYPE SEWAGE TREATMENT DEVICE

(71) Applicant: Chung-Heng Liao, Kaohsiung (TW)

(72) Inventors: Chung-Heng Liao, Kaohsiung (TW); Wen-Lung Wu, Tainan (TW)

(73) Assignee: Chung-Heng Liao, Kaohsiung (TW)

( * ) Notice: Subject to any disclaimer, the term of this patent is extended or adjusted under 35 U.S.C. 154(b) by 154 days.

(21) Appl. No.: 15/375,063

(22) Filed: Dec. 9, 2016

(65) Prior Publication Data

US 2018/0161692 A1 Jun. 14, 2018

(51) Int. Cl.
| | |
|---|---|
| *B01D 3/10* | (2006.01) |
| *B01D 1/00* | (2006.01) |
| *B01D 3/00* | (2006.01) |
| *C02F 1/04* | (2006.01) |
| *C02F 1/16* | (2006.01) |

(52) U.S. Cl.
CPC ........... *B01D 3/106* (2013.01); *B01D 1/0047* (2013.01); *B01D 1/0058* (2013.01); *B01D 3/007* (2013.01); *B01D 3/10* (2013.01); *C02F 1/048* (2013.01); *C02F 1/16* (2013.01); *C02F 2303/10* (2013.01)

(58) Field of Classification Search
CPC .... B01D 1/0047; B01D 1/0058; B01D 3/007; B01D 3/106; B01D 1/14; C02F 1/048; C02F 1/16; C02F 2303/10; C02F 1/04; C02F 1/046
See application file for complete search history.

(56) References Cited

U.S. PATENT DOCUMENTS 5,227,027 A * 7/1993 Topper ................... B01D 3/007
202/177

* cited by examiner

*Primary Examiner* — Renee Robinson
*Assistant Examiner* — Derek N Mueller
(74) *Attorney, Agent, or Firm* — Bruce Stone LLP; Joseph Bruce

(57) ABSTRACT

A steam heating type sewage treatment device includes: a treatment tank connected to a sewage supply pipe, a stirring device disposed in the treatment tank; a steam heating device disposed on an outer surface of the treatment tank; a vacuuming device fixed to a top of the treatment tank and connected to the treatment tank via a first connecting pipe; a heating device connected to the treatment tank by a second connecting pipe and connected to a steam storage tank by a third connecting pipe, and a fourth connecting pipe connected between the steam input pipe and the steam storage tank to recycle the steam. The heating device pressurizes or heats the steam entering the vacuuming device and the connecting pipes, and the heated steam is guided by pipes into the steam heating device, thus achieving the effect of steam recycling.

3 Claims, 2 Drawing Sheets

STEAM HEATING TYPE SEWAGE TREATMENT DEVICE

BACKGROUND

Field of the Invention

The present invention relates to a sewage treatment device, and more particularly to a steam heating type sewage treatment device.

Related Prior Art

There are many methods and devices for the treatment of sewage in the prior art, which includes the use of physical treatment, such as grid, filter and sediment tank, and the use of biological treatment equipment. Theses traditional treatment processes involve multiple filters and sediment tanks, the equipments are too large and complicated to be suitable for use in a medium or small enterprise. Besides, the treatment is affected by many factors, and it is therefore difficult to achieve an ideal effect of solid liquid separation. Due to the bad solid liquid separation effect, it is difficult to separate and recycle the recyclable substances from the sewage, causing great waste of resources.

Hence, the inventor of the present invention invented a one-stop sewage treatment device which is capable of treating the wastewater which consists of sludge, floc, and oil and water mixture, and separating solid and oil from the wastewater by negative pressure distillation, wherein the liquid is treated with evaporation and condensation, the solid residue will be discharged after drying and condensing, and can also be recycled when necessary. This device includes a treatment tank and an interlayer around the outer periphery of the tank. Hot liquid is injected into the interlayer to exchange heat with the wastewater in the treatment tank, so that the wastewater is heated to boiling point under certain pressure, and then the wastewater is recycled through evaporation and condensation. Currently, this device is used in the equipment using steam as the heat source. During the heat exchange, the boiled steam is discharged out via pipes or recycled via condensation. Discharging steam out is a waste of energy resource. Condensing the steam to water can recycle the water, but requires the use of condensing device, which not only increases the installation space but the cost as well. Besides, the latent heat of the steam is not effectively used yet, which is a waste, and this part still needs to be further improved.

SUMMARY

To solve the problem of the existing technology, the steam heating type sewage treatment device of the present invention is capable of recycling and heating the low temperature steam produced by the wastewater in the treatment tank, then the heated steam is introduced into the treatment device to heat the tank, which substantially reduces the energy waste, and achieves the effects of energy resource and cost saving.

One objective of the present invention is to provide a steam heating type sewage treatment device which is capable of recycling and heating the steam produced during the process of sewage treatment.

To achieve the objective, improvement has been made to the existing steam heating type sewage treatment device by eliminating the condensing device and introducing the low temperature steam produced by the treatment tank to a heating device which is used to heat the steam. Then, the steam which has reached to a desired temperature is guided into a steam input pipe for heating the treatment tank. Therefore, the demand for external steam begin to reduce significantly, which eliminates the use of condensing device for condensing and recycling of the steam, and enables the most effective use of the latent heat of the steam. Compared with the existing technology, the overall design of the present invention is more economical, environmental friendly and practical.

The technical scheme of the present invention is that: a treatment tank which is connected to a sewage supply pipe, a stirring device is disposed in the treatment tank; a steam heating device is disposed on an outer surface of the treatment tank; a vacuum pump is fixed to a top of the treatment tank and connected to the treatment tank via a first connecting pipe; a heat pump is connected to the vacuum pump by a second connecting pipe and connected to a steam storage tank by a third connecting pipe, and a fourth connecting pipe is connected between the steam input pipe and the steam storage tank to recycle the steam.

Preferably, a steam trap is provided on the second connecting pipe, a first steam return valve is disposed between the steam trap and the vacuum pump, and a wastewater collecting tank is disposed below the steam trap.

Preferably, a steam filter and a steam control valve are provided in the second connecting pipe between the vacuum pump and the heat pump.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
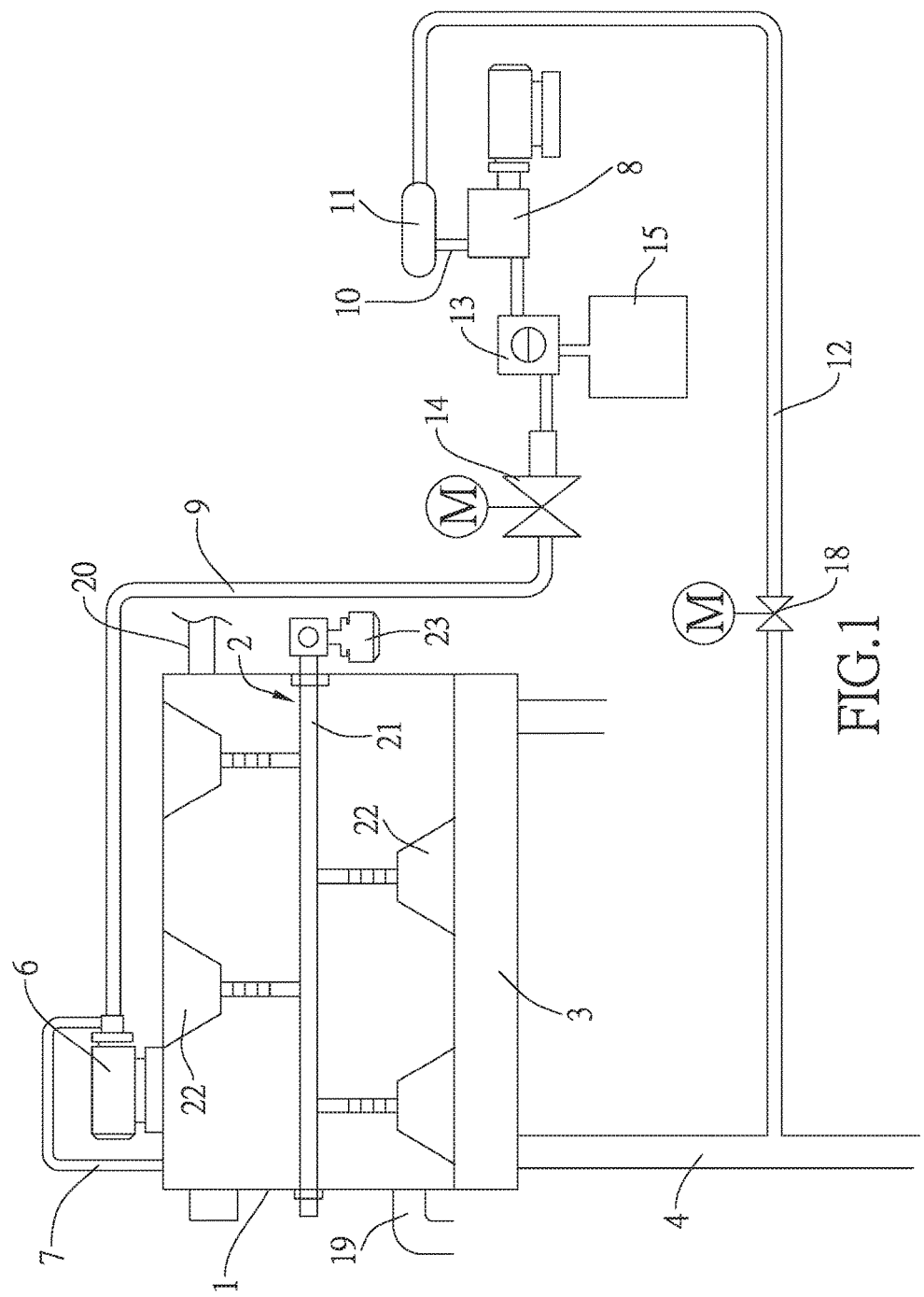
FIG. 1 shows a steam heating type sewage treatment device in accordance with a first embodiment of the present invention.

Referring to FIG. 1, a steam heating type sewage treatment device in accordance with the present invention comprises: a treatment tank 1, a stirring device 2, a steam heating device 3, a vacuuming device 6, and a heating device 8.

The treatment tank 1 communicates with a sewage supplying device via a sewage feeding pipe 20, so that sewage can be supplied by the sewage feeding pipe 20 to the treatment tank 1 for treatment.

The stirring device 2 is disposed in the treatment tank 1, and includes a stirring shaft 21 extending a radial direction of the treatment tank 1. A plurality of blades 22 is fixed to the stirring shaft 21 and radially extends out from the stirring shaft 21. The stirring shaft 21 has one end inserted through the treatment tank 1 and provided with a driving device 23.

The driving device 23 rotates the blades 22 by the stirring shaft 21, so as to fully stir the sewage contained in the treatment tank 1.

The steam heating device 3 is a sleeve structure sleeved onto the outer surface of the treatment tank 1. A steam input pipe 4 and a steam output pipe 5 are provided at two sides of a bottom of the steam heating device 3, so that steam can be fed into the steam heating device 3 via the steam input pipe 4 and discharged out therefrom by the steam output pipe 5.

The vacuuming device 6 (vacuum pump) is fixed to the top of the treatment tank 1, and connected to the treatment tank 1 via a first connecting pipe 7. During sewage treatment process, the treatment tank 1 is heated by the steam heating device 3, and turned into a negative pressure state by the vacuuming device 6, which reduces the boiling point of the liquid in the treatment tank 1 while accelerating liquid evaporation. Besides, the stirring of the stirring device 2 can also accelerate the evaporation, and the steam is discharged via the first connecting pipe 7. Finally, the solid residue formed after separation of the liquid via heat evaporation will be pushed out of a residue discharging hole 19 which is located at the bottom of the treatment tank 1.

The improvement of the present invention is explained as follows:

The heating device 8 is connected to the treatment tank 1 by a second connecting pipe 9. The heating device 8 can be a centrifugal steam compressor. A steam trap 13 is provided on the second connecting pipe 9 and located close to the heating device 8. Between the steam trap 13 and the vacuuming device 6 is provided a first steam return valve 14 which can be a one-way valve to control the steam to enter the steam trap 13 in a one way manner. The steam trap 13 processes the steam passing therethrough to separate steam and liquid, the separated liquid flows directly to a wastewater collecting tank 15 which is disposed below the steam trap 13, and the separated steam is sucked into and pressurized by the centrifugal steam compressor, which substantially increases the temperature of the steam.

The steam passing through and pressurized and heated by the heating device 8 (the centrifugal steam compressor) enters a steam storage tank 11 via a third connecting pipe 10. A fourth connecting pipe 12 has two ends connected to the steam storage tank 11 and the steam input pipe 4, and is further provided with a second steam return valve 18. When the high temperature steam in the steam storage tank 11 reaches a certain amount and pressure, it will flow through the fourth connecting pipe 12 and the second steam return valve 18 to the steam input pipe 4 in a one-way manner, and will be mixed with the steam input from outside and enter the steam heating device 3 to heat the treatment tank 1. So the cycle repeats, the steam can be recycled to heat the treatment tank 1, which eliminates the use of condensing device for condensing and recycling of the steam, and enables the most effective use of the latent heat of the steam. Compared with the existing technology, the overall design of the present invention is more economical and practical.

Figure 2:
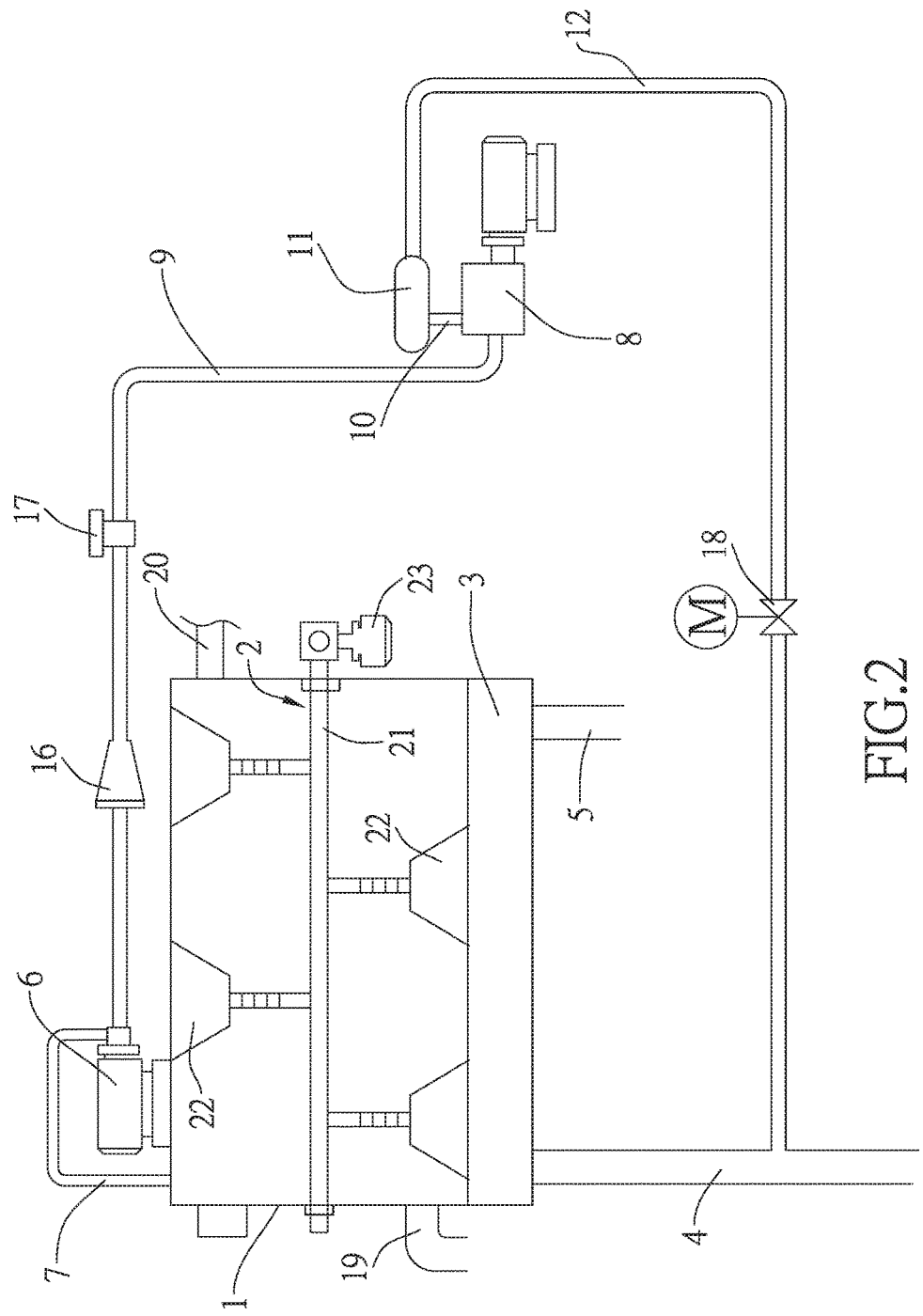
FIG. 2 shows a steam heating type sewage treatment device in accordance with a second embodiment of the present invention.

Referring to FIG. 2, a steam heating type sewage treatment device in accordance with another embodiment of the present invention also comprises: a treatment tank 1, a stirring device 2, a steam heating device 3, a steam input pipe 4, a steam output pipe 5, and a vacuuming device 6. The vacuuming device 6 is also connected to the treatment tank 1 with the first connecting pipe 7, and connected to the heating device 8 by the second connecting pipe 9.

The difference of this embodiment from the previous embodiment is that the heating device 8 can be a heat pump which is used to heat the recycled steam passing therethrough. The heated steam enters the steam storage tank 11 via the third connecting pipe 10. When the high temperature steam in the steam storage tank 11 reaches a certain amount and pressure, it will flow through the fourth connecting pipe 12 and the second steam return valve 18 to the steam input pipe 4 in a one-way manner, and will be fixed with the steam input from outside and enter the steam heating device 3 to heat the treatment tank 1. The second connecting pipe 9 is connected between the vacuuming device 6 and the heating device (the heat pump), and is further provided with a steam filter 16 and a steam control valve 17 to filter floating impurities, sorting water and steam, and control the flow direction of the steam. In actual application, the steam filter 16 and the steam control valve 17 can be replaced with the steam return valve, the steam trap and the wastewater collecting tank used in the previous embodiment. The steam trap 13 and the wastewater collecting tank 15 are used to remove the moisture to protect the heating device 8. The steam trap 13 and the wastewater collecting tank 15 can also be omitted according to needs when other equivalent heating device is used. Therefore, the first steam return valve 14, the steam trap 13, the wastewater collecting tank 15, the steam filter 16 and the steam control valve 17 can be selectively used or replaced with equivalent components according to the requirements of the heating device 8. The selection of the use of the components is determined by practical requirements.

In application, and at the beginning of the operation of the sewage treatment device, it needs to introduce external high temperature steam which has already been heated into the steam heating device 3 to heat the treatment tank 1, and then the vacuuming device 6 creates a negative pressure state in the treatment tank 1. When the liquid inside the treatment tank 1 reaches a low boiling point corresponding to the pressure, it will be evaporated into steam and sucked out of the treatment tank 1. The steam is then introduced by pipes into the heating device (heating pump) and heated therein to a high temperature, and then reintroduced into the steam input pipe 4 by the steam storage tank 11 and the fourth connecting pipe 12, and finally mixed with the steam input from outside and enter the steam heating device 3 to heat the treatment tank 1. So the cycle repeats, the steam can be recycled to heat the treatment tank 1, as long as the treatment tank 1 still produces steam. With this recycle design, the sewage treatment device can produce recycled steam, therefore, the demand for external steam begin to reduce significantly, which eliminates the use of condensing device for condensing and recycling of the steam, and enables the most effective use of the latent heat of the steam. Compared with the existing technology, the overall design of the present invention is more economical and practical.

While we have shown and described various embodiments in accordance with the present invention, it is clear to those skilled in the art that further embodiments may be made without departing from the scope of the present invention.

What is claimed is:

1. A steam heating type sewage treatment device, comprising:
   a treatment tank;
   a stirring device disposed in the treatment tank;
   a steam heating device disposed on an outer surface of the treatment tank, and provided with a steam input pipe at one side of the bottom of the steam heating device and a steam output pipe at the opposing side of the bottom of the steam heating device;

a vacuum pump fixed to a top of the treatment tank, and connected to the treatment tank via a first connecting pipe; the steam heating type sewage device being characterized in that:

a heat pump is connected to the vacuum pump by a second connecting pipe, and connected to a steam storage tank by a third connecting pipe, and a fourth connecting pipe is connected between the steam input pipe and the steam storage tank.

2. The steam heating type sewage treatment device as claimed in claim 1, wherein a steam trap is provided on the second connecting pipe, a first steam return valve is disposed between the steam trap and the vacuum pump, and a wastewater collecting tank is disposed below the steam trap.

3. The steam heating type sewage treatment device as claimed in claim 1, wherein a steam filter and a steam control valve are provided in the second connecting pipe between the vacuum pump and the heat pump.

\* \* \* \* \*